3,067,133
WATER TREATMENT
Walter R. Conley, Jr., Kennewick, and Raymond W. Pitman, Richland, Wash., assignors to the United States of America as represented by the United States Atomic Energy Commission
Filed Jan. 6, 1960, Ser. No. 893
4 Claims. (Cl. 210—42)
(Granted under Title 35, U.S. Code (1952), sec. 266)

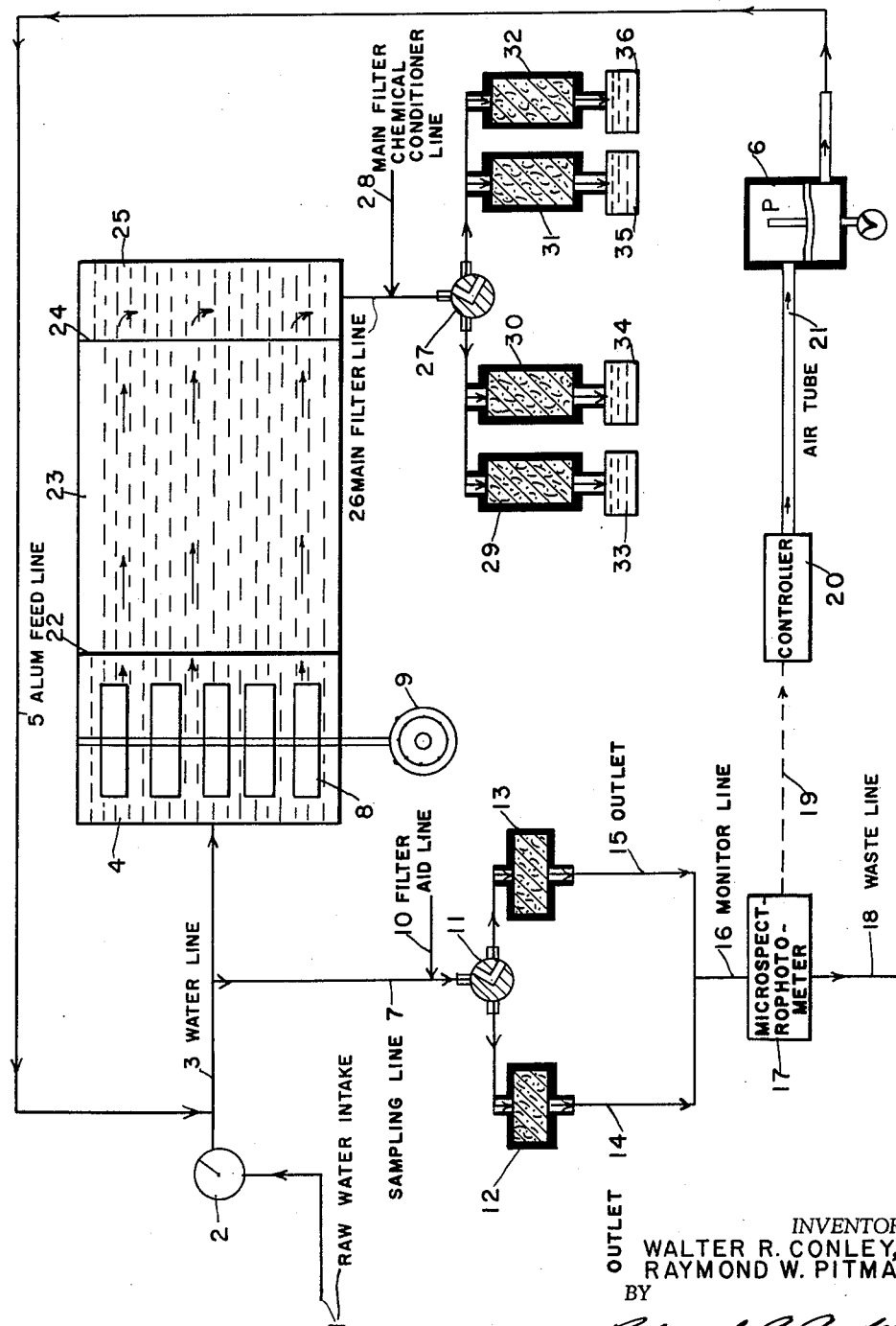

This invention relates to a novel method of large scale water treatment, more particularly to an improved method for automatically adjusting the rate of addition of clarifying chemicals as the level of turbidity of incoming water fluctuates, such adjustment being both more prompt and more accurate than is possible with presently known methods.

In the water treatment art, no particular problem is presented when it comes to adding chemicals automatically to take care of fluctuations of strictly inorganic dissolved components of the incoming water. The concentrations of these may be readily determined within a few seconds or even less by continuous conductometric monitoring devices, or other types of continuous monitoring devices known to the art; the monitoring devices may then be arranged to send a variable electrical signal to a metering apparatus which controls the flow of the chemical in question, usually an inorganic electrolyte that dissolves readily in the water, thereby automating the entire process of addition of chemicals of this class. A common example of such an automatic process is the addition of sodium carbonate to remove the hardness caused by fluctuations of calcium and magnesium bicarbonates dissolved in incoming water.

Following the success of these methods, attempts were made to automate the addition of chemicals designed to remove or reduce the undissolved components, or turbidity, of the incoming water; for convenience, chemicals of this class will herein be referred to generally as clarifying chemicals.

Practically all water turbidity treatment systems now in use, whether for municipalities or for industries, include three steps: flocculation, followed by settling and filtration, There may be a preliminary filtration step to eliminate very coarse particles such as gravel, but ordinarily a rather coarse mesh metal screen is deemed sufficient for the purpose. After passing through this screen the water then is treated with a clarifying chemical known as a flocculator, or synonymously, a flocculating agent, which is alum, ferrous sulfate or some other such inorganic salt which hydrolyzes to form a colloidal hydroxide precipitate; this is mechanically mixed with the water as it is added or soon thereafter by stirring as in a "flocculator," the term in this sense being used to designate the vessel in which flocculation occurs, which may serve as the mixing vessel as well. After the mixing the water containing the dispersed precipitate is led into "settling basins" where the precipitate, or "floc" slowly settles to the bottom taking down with it the various particles, organic and inorganic, responsible for the turbidity.

Of recent years, a second class of clarifying chemicals known as flocculation aids or coagulation aids have come into use, which impart to the inorganic flocculating agents an increased degree of effectiveness in attracting and entrapping the particles causing the turbidity. These are sticky, colloidal organic substances with a comparatively inert carbon skeleton of considerable size, and bearing numerous hydroxyl, amine, carboxyl, amide or other water compatible, colloidally active groups, or a combination of these; included in the class are polysaccharides, polyacrylamides, acrylamide polymer hydrolytes, including polyacrylamides upon which carboxylic groups have been substituted for some of the amide groups; carboxymethylcelluloses, alginates, carrageenins, guar gum, and similar substances. The reason for the synergistic action of these compounds in conjunction with conventional flocculating agents is not perfectly understood, but is generally believed to be due to the formation of a layer, possibly monomolecular, over the surface of the metallic hydroxides that attracts and holds the turbid particles more strongly than can the unaided hydroxides. Flocculation aids must be added even more precisely than the conventional inorganic flocculators; over-addition is especially harmful since it tends to cause the floc to hold together in an impervious mass that does not settle, and clogs the water treatment system.

Whether the flocculation is made with the synergistic action of flocculation aids on the inorganic flocculators, or by the latter alone, after the floc settles in the settling basins, the supernatant water is siphoned or otherwise carefully drained off so as to cause a minimum disturbance of the settled floc, and led into filters. The settling process usually requires about five hours or so, and never less than one hour even for waters of minimum initial turbidity. The chief function of filters is to catch particles of the floc which either did not settle in the settling basins, or which after settling were disturbed as the supernatant water was being drained and rose again into the stream. Filters can be of many types, but we prefer the type of filter described in the U.S. patent application of Russell B. Richman, Walter R. Conley, and Roy W. Pitman, Serial No. 804,055, filed April 3, 1959.

In any event, regardless of the type of filter used and the details of the settling basin and other components of the water treatment system it appeared quite feasible at the outset to adapt the principles of the successful automated systems above described for controlling the addition of inorganic chemicals to one for controlling the addition of clarifying chemicals. A number of available devices were capable of measuring the degree of turbidity of incoming water; these were not only accurate, but sufficiently fast in operation to be used as continuous monitoring devices, comparable to the conductometric monitoring devices used in the inorganic systems. These were arranged to monitor the turbidity of the incoming raw water and as this fluctuated to respond by sending out a variable electric signal capable of controlling through a relay system the rate of addition of clarifying chemicals in the same manner as had been done with such success for the addition of inorganic chemicals.

In actual practice, however, a comparable success was not attained when it came to adding clarifying chemicals. For reasons that were not understood some automated systems, after working reasonably well for a while, suddenly became unreliable and fed either too small an amount of the chemicals into the water whereby the treated water contained unacceptable levels of turbidity, or too much, with the consequent clogging above referred to. Other installations failed to work at any time even though checking of the monitoring device showed it to be in perfect working order, and the other parts of the control system were not at fault. For this reason, automation of this aspect of water treatment was largely abandoned and the rate of chemical addition continued to be determined by a human operator viewing the appearance of the floc as the flocculator or other clarifying chemicals were added.

Several serious objections exist to the method of determining the rate of adding chemicals just described; the pay of the operator is a continuous expense; the operator, in order to be on the safe side, has a tendency to overestimate the amount of chemicals needed so that over a period of time, an economically important loss for the unneeded chemicals mounts up, and because of the unnecessarily large amount of floc to be handled due to the overestimation referred to, water treatment is slower and larger settling basin areas and more filters are required to handle the floc than would otherwise be necessary. This results in much greater capital outlays for water treatment plants than would be the case if the amount of chemicals to be added could be determined precisely and accurately, with the element of human judgment eliminated.

For coolant water for use in nuclear reactors of the single-pass, or nonrecirculating water-cooled type, the requirements of freedom from turbidity are very great since the fouling on the cooling tubes of such reactors known as "crud," due to the accumulation of turbid particles, lowers heat conductivity quite drastically and leads to melt-downs of reactor fuel elements. It is therefore desirable to find some method whereby the turbidity of water to be used as a coolant in such reactors may be controlled with more precision than is possible with presently known methods.

The FIGURE is a schematic diagram of a model filter, or water treatment plant with an automatic alum feed control, made in accordance with the teachings of the invention.

It is an object of the invention to provide a method for precisely and promptly determining automatically and without the interposition of human judgment, the amounts of chemicals required for the reduction of turbidity in water treatment plants.

It is a further object of the invention to provide a method for precisely and promptly determining and controlling automatically and without the aid of human judgment, the rate of addition of clarifying chemicals to incoming water in water treatment plants.

It is a further object to provide a method of treating water more rapidly and with smaller outlays for settling basins and filters than is possible with presently known methods.

All the foregoing objects are attained by our discovery that if a small sample of an unsettled floc suspension is taken from the main body of water under treatment and minor amounts of coagulation aid chemicals are added thereto, the suspension may then be put directly, and without any settling, through a fast sampling filter and the turbidity of the sampling filtrate water will bear a sufficiently close linear relationship to the amount of clarifying chemicals needed to control the turbidity of the water that it may be used as a basis for automatically controlling the addition of clarifying chemicals. The water coming through the sampling filter is not necessarily of exactly the same turbidity as that of the water which will come later from the main filter, but this is not a disadvantage since all that is necessary is that there be a linear relationship between the turbidity of the sampling filtrate water and the amount of chemicals needed to bring the turbidity of the main filtrate water to a desired level, and then the signal sent out by the monitoring device such as a spectrophotometer may be amplified accordingly; our discovery is that water with the necessary linearity may not only be produced but produced in a rapid manner, in as little as three minutes, merely by adding flocculation aids to a newly created floc suspension and filtering at once.

One explanation that has been offered to explain the success of our invention compared to the failure of previous attempts at automation is that turbidity is due to several classes of materials of different colloidal characteristics so that the optical turbidity of incoming waters has no linear relationship to the amount of clarifying chemicals needed to treat it; some materials registering high optical turbidity might require but very small amounts of chemicals to eliminate them, whereas others require quite disproportionate amounts compared to the effect they produce on monitoring devices; furthermore, the concentrations of these different classes of materials vary as between each other from time to time. When the watershed of the stream in question contains large areas under cultivation, surface soil materials such as clay and organic matter are more abundant, as might be expected, when the land is bare in the spring of the year, whereas turbid particles derived from other sources such as mountain streams with hard rock bottoms vary quite directly with the volume of stream flow, the silica content of some streams, for example, remaining nearly constant the year around. All these qualitative and quantitative differences make for a highly variable turbidity in the incoming water, but what is surprising is that when the class of chemicals known as flocculation or coagulation aids is put into a suspension of floc in the water and the water is filtered, those components that tend to upset the linear relationship between the optical turbidity of the raw incoming water and the quantitative requirements for clarifying chemicals to treat the water are selectively taken out, apparently due to some exceptionally strong affinity between the class of chemicals mentioned and the components of turbidity causing the upset. We believe that this explanation has much in its favor, but since it has not been proved rigorously to be valid we prefer not to be bound by it or any other theory; our invention is offered on the basis of findings which we have made empirically, whereby successful systems have been made for automatically adding clarifying chemicals to raw incoming waters without settling of the floc and without the need for a human operator to observe the appearance of the floc and mentally determine the amount of chemicals to be added.

In carrying out our invention we have found that quite a small tube, on the order of one inch in diameter, is sufficiently large to transport the sampling stream of the floc suspension when the sampling filter is sufficiently fast and a sufficiently sensitive instrument is used to monitor the turbidity of the sampling filtrate water.

Various types of sampling filters may be used, but we prefer sampling filters similar to the main filters of the water treatment plant, particularly the preferred type above referred to as being described in application Serial No. 804,055. These filters are broadly characterized by the fact that the ratio of the thickness of the upper layer of relatively coarse particles such as anthracite coal to the thickness of the lower layer of relatively small particles such as sand is greater than is the ratio in conventional filters; for example, this ratio is frequently 1 to 2 in conventional filters whereas in the preferred filters mentioned it may be 9 to 1 or even greater. When a flocculation aid type of chemical is fed into the water shortly before it enters the filter it adheres to the surfaces of the large particles where it attracts and holds the particles of the suspended floc; this makes it possible to filter such a suspension without the preliminary step of settling in a basin, whereas conventional filters would become clogged so rapidly as to make our method of automation impractical in all but exceptional cases. Of course, even with our preferred filters, clogging will take place eventually and it is therefore advisable that one or more alternate filters be available for the sampling stream, the filters being backwashed between periods of use.

Any one of the flocculation aid chemicals described in the fifth paragraph of this application may be used as a filter conditioner for the sampling filter; however, we prefer Separan, an acrylamide polymer hydrolyte having from about 0.8 to 10 percent of the amide groups replaced by carboxyl groups; another about equally preferred filter aid is Hagan Coagulant Aid No. 2, a polysaccharide. The amount of flocculation aid chemicals, or filter conditioner chemicals to be added depends upon the turbidity of the incoming water, but is ordinarily on the order of thousandths of grains per gallon; the amount required varies from about 0.0001 grain per gallon for incoming water of low turbidity to about 0.0009 grain per gallon for very turbid water. The diameter of the filter, its length and other dimensions depend, of course, on the turbidity of the incoming water and the requirements set for that of the final product water; we have found, however, for average conditions a filter one inch in diameter with a lower six-inch layer of 0.4 mm. sand and an upper 24-inch layer of 0.8 mm. anthracite coal to be quite satisfactory.

The filtrate water from the sampling filter is next led through the turbidity monitoring device. Any sufficiently sensitive turbidity monitoring instrument may be used, but of those now available, we prefer a light scattering spectrophotometer having a light source from which a beam passes through the filtrate sample with a photocell set at an angle from the path of the beam, whereby some of the light is scattered by the turbid particles and impinges on the photocell generating a small current, which is amplified in a photomultiplier or other amplifying device. We have found, after extensive testing, an angle of 15 degrees to be the most practical in providing the most sensitivity and reproducibility. The spectrophotometer may be calibrated for turbidity by using a bentonite suspension having a known value of turbidity, which is prepared, allowed to settle, and the clear portion decanted. The turbidity of this portion is determined on a spectrophotometer which has been previously calibrated and then the same decantate is placed in the spectrophotometer to be calibrated and the determination made by it compared with those made by the calibrated spectrophotometer. Appropriate adjustments of the photomultiplier and other components of the former are made until its determinations agree with those made by the calibrated spectrophotometer. The amplified electrical impulses may then be utilized as signal to actuate the clarifying chemical feed control system.

Many types of feed devices could be utilized to receive the electric signal from the monitoring device, but we prefer controllers that convert the signal to controlled air pressure. The air pressure may then position a diaphragm on one or more pumps thereby controlling the length of the stroke of the piston or pistons which, in turn, controls the amount of chemical fed into the water; if a flocculating agent is used alone, one pump is sufficient, but if flocculation aids or other auxiliary chemicals are employed, one or more additional pumps may be added. This is optional since in certain cases it is not economical to automate the addition of auxiliary chemicals but to limit the automatic control system to the flocculating agents alone.

By means of a system comprising the preferred elements just described treated water has been produced with the extremely low turbidity of 0.05 part per million (p.p.m.), with extremely short settling times, and a filtration rate of 6 to 10 gallons per minute per square foot (g.p.m./ft.$^2$) which is double or more the usual 4 g.p.m./ft.$^2$ which water treatment authorities at present consider the maximum permissible flow rate.

*Example*

A filter plant with automatic alum feed control, shown schematically in the figure, comprises raw water intake line 1, water meter 2, and water line 3, which carries the water from the meter into flocculation vessel 4. Intermediate 2 and 4 line 3 is connected to alum feed line 5 carrying an alum solution impelled by alum pump 6, and about 15 feet further along in the line of flow, line 3 is connected to sampling line 7 which is one inch in diameter. The turbulence along the fifteen foot length of pipe 3 gives sufficient mixing of the sample with the alum without other mechanical agitation, but for the main body of water paddles 8, actuated by motor 9, complete the mixing of the floc suspension in the flocculation vessel 4. Filter aid line 10 just ahead of two-way valve 11 admits flocculation aid chemicals, also sometimes referred to as filter aid chemicals, to sampling line 7. Two-way valve 11 directs the flow of the sampling stream into either of filters 12 or 13 depending on which has been more recently backwashed by a backwashing mechanism (not shown). After leaving the particular filter, the sampling stream passes through either outlet line 14 or 15 as the case may be into monitor line 16, from which it enters microspectrophotometer 17, the spent sampling stream passing out through waste line 18. Microspectrophotometer 17 generates a variable electrical signal which is conducted by means of wire 19 to controller 20 which translates the electrical signal into a variable air pressure which passes through air tube 21 to alum pump 6 and by positioning a diaphragm regulates the length of the piston stroke of the pump, thereby controlling the amount of alum solution forced into alum line 5. Perforated baffle 22 permits the floc suspension to overflow out of flocculating vessel 4 into settling basin 23, and overflow baffle 24 permits the supernatant water to overflow into water flume 25. The flume water is then led through main filter line 26 to valve 27; intermediate these main filter conditioner chemical line 28 injects auxiliary filter conditioner chemicals from a hand controlled source (not shown) into main filter line 26; valve 27 may be placed in two positions one of which directs the flume water into the pair of filters 29 and 30, and the other into pair of filters 31 and 32. The filtered, treated water comes through the filters into the respective flumes 33, 34, 35 and 36, and has been found to meet the standards of turbidity required for use as a coolant in nonrecirculating nuclear reactors.

The dimensions of the various elements above described and other pertinent data is as follows:

| | |
|---|---|
| Water meter 2 | 0.1 to 5 g.p.m. capacity. |
| Flocculating vessel 4 | 1½′ x 1½′ x 6′. |
| Paddles 8 | 1′ x 1′ x ¼″. |
| Motor 9 | Adjustable speed ⅒ r.p.m. to 5 r.p.m. |
| Settling basins 23 | 10′ x 6′ x 22″, retention time 66 min. at 5 g.p.m. flow. |
| Filters 29, 30, 31, and 32 | 6″ diameter, 6′ length, packed with, from bottom to top, 6″ coarse gravel, 6″ of 0.4 mm. effective size sand, 24″ of 0.8 mm. effective size anthracite coal. Rate of flow, 2 g.p.m. to 10 g.p.m. per square foot. |
| Sampling line 7 | 1 inch diameter. |
| Sampling filters 12 and 13 | 1 inch diameter glass tube 3 ft. long packed with, from bottom to top, 6″ 0.4 mm. sand and 24″ 0.8 mm. anthracite coal. |
| Rate of addition by filter condition line 10 | 0.0001 to 0.0005 grains per gallon. |
| Filter conditioner used in line 10 | Separan, an acrylamide polymer hydrolyte having from about 0.8% to 10% of the amide groups replaced by carboxyl groups, a 0.5% by weight aqueous solution having a viscosity of about 4.0 centipoises. |

What is claimed is:

1. A method of automatically adjusting the rate of addition of clarifying chemicals to remove the turbidity of raw water which comprises adding an inorganic flocculating agent to said raw water, then leading off a sampling stream, adding an organic filter aid chemical to said sampling stream, said filter aid chemical being added in an amount that is insufficient to cause complete clarification of the water in said sampling stream, said organic filter aid chemical being one selected from the group consisting of polysaccharides, polyacrylamides, acrylamide polymer hydrolytes, carboxymethylcelluloses, alginates, carrageenins and guar gum, then immediately filtering the sampling stream through a fast sampling filter, monitoring the filtrate with a turbidity sensing device which converts the turbidity sensings into a variable electric signal, and carrying the signal to a control device whereby the amount of clarifying chemicals are added in proportion to the turbidity sensings.

2. The method of claim 1 in which the flocculating agent is a salt which hydrolyzes in water to form a colloidal hydroxide precipitate.

3. The method of claim 1 in which the organic filter aid chemical is added to the sampling stream in an amount from about 0.0001 grain per gallon to about 0.0009 grain per gallon.

4. A method of removing the turbidity of raw water which comprises adding an inorganic flocculating agent thereto, dividing the water into a main stream and a sampling stream, agitating the water in said main stream in a flocculating vessel, allowing the floc in said main stream to settle in a settling basin, filtering the water coming from said settling basin, and automatically adjusting the rate of addition of the clarifying chemicals used to remove the turbidity of the raw water by the steps which comprise adding an organic filter aid chemical to said sampling stream, said filter aid chemical being added in an amount that is insufficient to cause complete clarification of the water in said sampling stream, said organic filter aid chemical being one selected from the group consisting of polysaccharides, polyacrylamides, acrylamide polymer hydrolytes, carboxymethylcelluloses, alginates, carrageenins and guar gum, then immediately filtering the sampling stream through a fast sampling filter, monitoring the filtrate with a turbidity sensing device which converts the turbidity sensings into a variable electric signal, and carrying the signal to a control device whereby the amount of clarifying chemicals are added in proportion to the turbidity sensings.

References Cited in the file of this patent

UNITED STATES PATENTS

| | | |
|---|---|---|
| 1,943,684 | Martin et al. | Jan. 16, 1934 |
| 2,299,529 | Crampton | Oct. 20, 1942 |
| 2,350,111 | Hood | May 30, 1944 |
| 2,361,235 | Pick | Oct. 24, 1944 |
| 2,688,550 | McFarlane | Sept. 7, 1954 |

FOREIGN PATENTS

| | | |
|---|---|---|
| 522,851 | Canada | Mar. 20, 1956 |
| 589,543 | Canada | Dec. 22, 1959 |

OTHER REFERENCES

"Separan 2610 in Water Treatment" (brochure), published by Dow Chemical Company of Midland, Michigan (October 1956).